US007682188B1

(12) United States Patent
Lu

(10) Patent No.: US 7,682,188 B1
(45) Date of Patent: Mar. 23, 2010

(54) FASTENING STRUCTURE OF SIGNAL CONNECTOR

(75) Inventor: Shan-Jui Lu, Xizhi (TW)

(73) Assignee: Lantek Electronics Inc., Taipei County (TW)

( * ) Notice: Subject to any disclaimer, the term of this patent is extended or adjusted under 35 U.S.C. 154(b) by 0 days.

(21) Appl. No.: 12/258,535

(22) Filed: Oct. 27, 2008

(30) Foreign Application Priority Data

Sep. 4, 2008 (TW) .............................. 97215951 U

(51) Int. Cl.
*H01R 13/73* (2006.01)
*F16B 19/00* (2006.01)

(52) U.S. Cl. ....................................... 439/550; 411/361

(58) Field of Classification Search ................. 439/550, 439/551; 411/360, 361, 277, 285; 200/296
See application file for complete search history.

(56) References Cited

U.S. PATENT DOCUMENTS 985,395 A * 2/1911 Christensen ................ 439/550
1,406,065 A * 2/1922 Norwood .................... 411/285
3,560,124 A * 2/1971 Bergere ...................... 411/361
4,496,791 A * 1/1985 Reichert et al. ............... 174/51
6,066,817 A * 5/2000 Flegel ........................ 200/296
6,398,450 B1 * 6/2002 Jarvis ......................... 403/329

* cited by examiner

*Primary Examiner*—Neil Abrams
(74) *Attorney, Agent, or Firm*—Guice Patents PLLC

(57) ABSTRACT

The present invention relates to a fastening structure of signal connector, comprises: a connector main body, which is a round-column shaped member, an insert orifice is provided on a top end of the connector main body and a signal terminal is provided in the connector main body, a middle portion of the connector main body has a combining ring-shaped surface, a positioning slot is provided on the combining ring-shaped surface, a bottom portion of the connector main body is provided with a positioning section; the connector main body is passed through a through hole preset on a base seat of an electronic equipment and the positioning section thereof is connected to a jointing section provided at a bottom end of the through hole; and a latching ring, an arched connecting sheet is provided between a top ring member and a bottom ring member for connection, and the latching ring is sleeved on the combining ring-shaped surface via the top end of the connector main body, so the bottom end of the bottom ring member is against the base seat and the connecting sheet is positioned in the positioning slot; when the top ring member is punched and downwardly moved, the connecting sheet is compressed and deformed and is latched in the positioning slot, so the connector main body is stably and tightly fastened on the base seat.

13 Claims, 8 Drawing Sheets

FASTENING STRUCTURE OF SIGNAL CONNECTOR

BACKGROUND OF THE INVENTION

1. Field of the Invention

The present invention relates to a signal connector, more particularly to a fastening structure of signal connector.

2. Description of Related Art

A signal connector is a necessary unit for an electronic equipment for signal inputting/outputting, the electronic equipment, e.g. a coaxial cable distributor, or a multitap, or a splitter, a signal amplifier, or a direction coupler module having functions of signal distributing, coupling and amplifying, is often provided at outdoors, so rainwater often penetrates into the signal connector and this may cause poor signal receiving efficiency.

As shown in FIG. 1, which is a schematic view of a signal connector of a conventional coaxial cable, the signal connector passes through a base seat, and the portion of the signal connector provided above the location where the base seat is provided has a thread section 101, so a nut 102 can be screw-fitted via the thread section 101, the signal connector is therefore fastened on the base seat 20 for connecting with a joint of an end section of a coaxial cable so as to obtain an electrical connection. For providing a waterproof function, a waterproof lining ring (not shown) is often provided on the signal connector 10; because the whole portion of the signal connector 10 is provided with thread, the waterproof lining ring is not able to be tightly provided on the surface of the column member of the signal connector, a poor waterproof effect is therefore occurred.

To overcome the disadvantages that the fastening structure of the described signal connector has a poor waterproof effect, skilled people in the arts have developed various fastening structures for fastening signal connectors and electronic equipments, as shown in FIG. 2, a top portion of a signal connector 30 has a thread section 301, a middle portion thereof has a plane ring-shaped surface 302, and a blocking ring 303 is radially and protrudingly provided below the plane ring-shaped surface 302, a bottom portion of the signal connector 30 has another thread section 304 for being directly screw-fitted in a thread hole 201 of a base seat 20. A function provided by the plane ring-shaped surface 302 is that a waterproof lining ring can be tightly provided thereon and a better waterproof effect is obtained. But the signal connector 30 is fastened on the base seat 20 by the thread section 304 provided at the bottom portion of the signal connector 30, an operation of reverse rotation is capable of letting the signal connector 30 and the base seat 20 be separated from each other, therefore the fastening structure provided is not efficient and practical.

Referring to FIG. 3, which is a schematic view of a signal connector of another embodiment, the structure is substantially the same as the structure of the signal connector shown in FIG. 2, in other words a top portion of a signal connector 40 has a thread section 401, a middle portion thereof has a plane ring-shaped surface 402, a blocking ring 403 is radially and protrudingly provided below the plane ring-shaped surface 402, a mounting section 404 having an outer diameter larger than that of a sheet hole 202 of the base seat 20 is extendedly provided below the blocking ring 403, the mounting section 404 of the signal connector 40 is mounted in the sheet hole 202 of the base seat 20 by a tightening means for fastening. But the tightening status can be loosed via applying an external force, the signal connector 40 and the base seat 20 are separated, so the tightening fastening means provided is also not efficient and practical.

SUMMARY OF THE INVENTION

The applicant of the present invention has devoted himself to the electronic equipment industry for years, especially to design and commercially distribute coaxial cable splitters, multitaps, signal amplifiers, directional coupler modules, with a hope to overcome disadvantages of poor connecting efficiency of a fastening structure of a signal connector that causes the signal connector and the electronic equipment can be separated via an external force; after try and error, the present invention "Fastening structure of signal connector" is provided.

One object of the present invention is to provide a fastening structure of signal connector having a stable and tight connection.

Another object of the present invention is to provide a fastening structure of signal connector which is simple in structure and an installation of a waterproof lining ring on the signal connector is not effected.

For achieving the objects mentioned above, one solution provided by the present invention is to provide a fastening structure of signal connector, comprises: a connector main body, which is a round-column shaped member, an insert orifice is provided on a top end of the connector main body and a signal terminal is provided in the connector main body, a middle portion of the connector main body has a combining ring-shaped surface, a positioning slot is provided on the combining ring-shaped surface, a bottom portion of the connector main body is provided with a positioning section; the connector main body is passed through a through hole preset on a base seat of an electronic equipment and the positioning section thereof is connected to a jointing section provided at a bottom end of the through hole; and a latching ring, an arched connecting sheet is provided between a top ring member and a bottom ring member for connection, and the latching ring is sleeved on the combining ring-shaped surface via the top end of the connector main body, so the bottom end of the bottom ring member is against the base seat and the connecting sheet is positioned in the positioning slot; when the top ring member is punched and downwardly moved, the connecting sheet is compressed and deformed and is latched in the positioning slot, so the connector main body is stably and tightly fastened on the base seat.

Another solution provided by the present invention is to provide a fastening structure of signal connector, comprises: a connector main body, which is a round-column shaped member, two ends thereof are respectively provided with an insert orifice and respectively provided with a signal terminal in the connector main body, a top portion of the connector main body has a thread section, a middle portion of the connector main body has a combining ring-shaped surface, and a positioning slot is provided on the combining ring-shaped surface, a positioning section and an extended second thread section are in sequence provided below the positioning slot; the connector main body is passed through a through hole preset on a base seat of an electronic equipment and the positioning section thereof is against the base seat; and a latching ring, an arched connecting sheet is provided between a top ring member and a bottom ring member for connection, and the latching ring is sleeved on the combining ring-shaped surface via the top end of the connector main body, so the bottom end of the bottom ring member is against the base seat and the connecting sheet is positioned in the positioning slot;

when the top ring member is punched and downwardly moved, the connecting sheet is compressed and deformed and is latched in the positioning slot, so the connector main body is stably and tightly fastened on the base seat.

DETAILED DESCRIPTION OF THE PREFERRED EMBODIMENT

Figure 3:
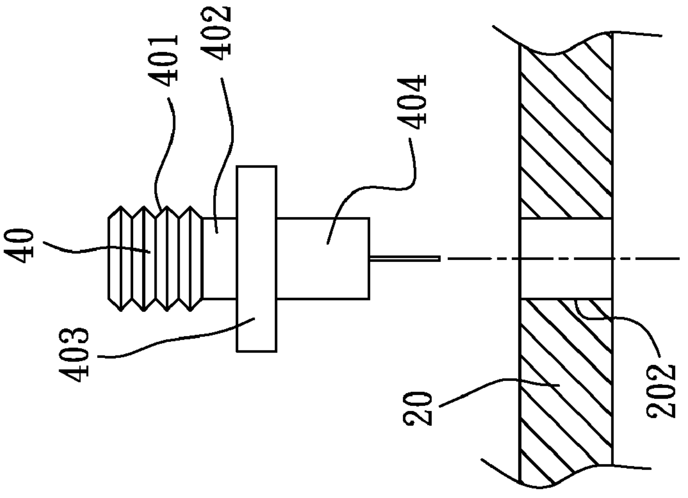
(PRIOR ART) FIG. 3
FIG. 3 is a schematic view of a conventional signal connector and an electronic equipment.
Figure 2:
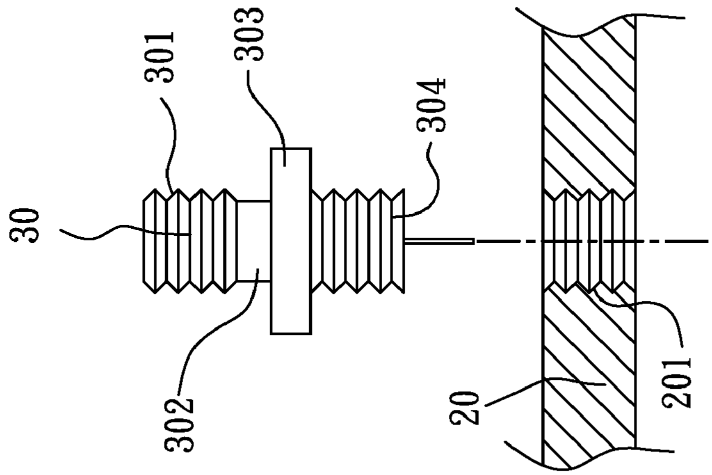
(PRIOR ART) FIG. 2
FIG. 2 is a schematic view of a conventional signal connector and an electronic equipment.
Figure 1:
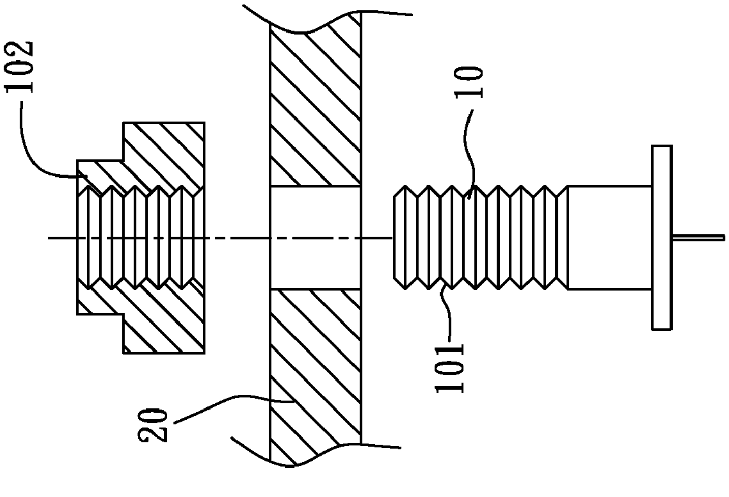
(PRIOR ART) FIG. 1
FIG. 1 is a schematic view of a conventional signal connector and an electronic equipment.
Figure 4:
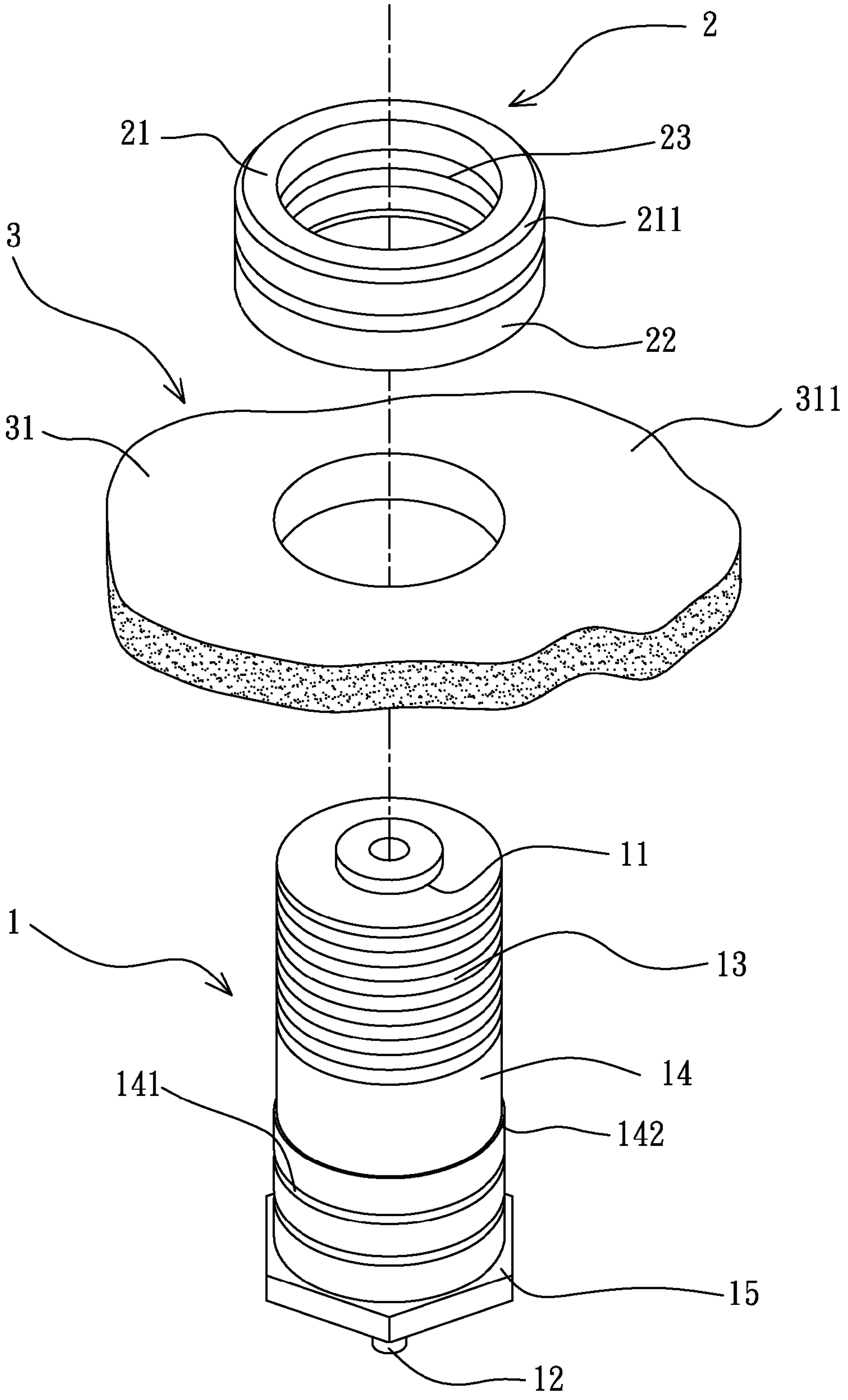
FIG. 4 is a 3D exploded view of the signal connector provided by the present invention and an electronic equipment.

As shown in FIG. 4, the fastening structure of signal connector provided by the present invention is composed by a connector main body 1, a latching ring 2 and an electronic equipment 3.

The connector main body 1 is in a round-column shape, an insert orifice 11 is formed on a top end of the connector main body 1, and a signal terminal 12 (shown in the FIG. 5) is provided inside the connector main body 1, a top portion of the connector main body 1 has a thread section 13 for being connected to a joint of an end section of a coaxial cable so as to obtain an electrical connection. A middle portion of the connector main body 1 is provided with a combing ring-shaped surface 14, a positioning slot 141 is provided on the combing ring-shaped surface 14, the combining ring-shaped surface 14 is preferably designed to a stepped shape, so a flange 142 having a larger outer diameter is obtained and the positioning slot 141 is disposed below the flange 142.

For positioning the connector main body 1 on a base seat 31 of the electronic equipment 3, a bottom portion of the connector main body 1 is radially and protrudingly provided with a positioning section 15, as shown in FIG. 4, the positioning section 15 is in a geometric shape, e.g. a hexagonal block member. When being assembled, a jointing section 312 having a shape corresponding to the shape of the positioning section 15 is provided at a bottom end of a through hole 311 of the base seat 31, e.g. a hexagonal rib member, then the connector main body 1 is passed through the through hole 311 provided at the bottom end of the base seat 31, so the positioning section 15 is provided on the jointing section 312 and a temporary positioning is obtained.

Figure 5:
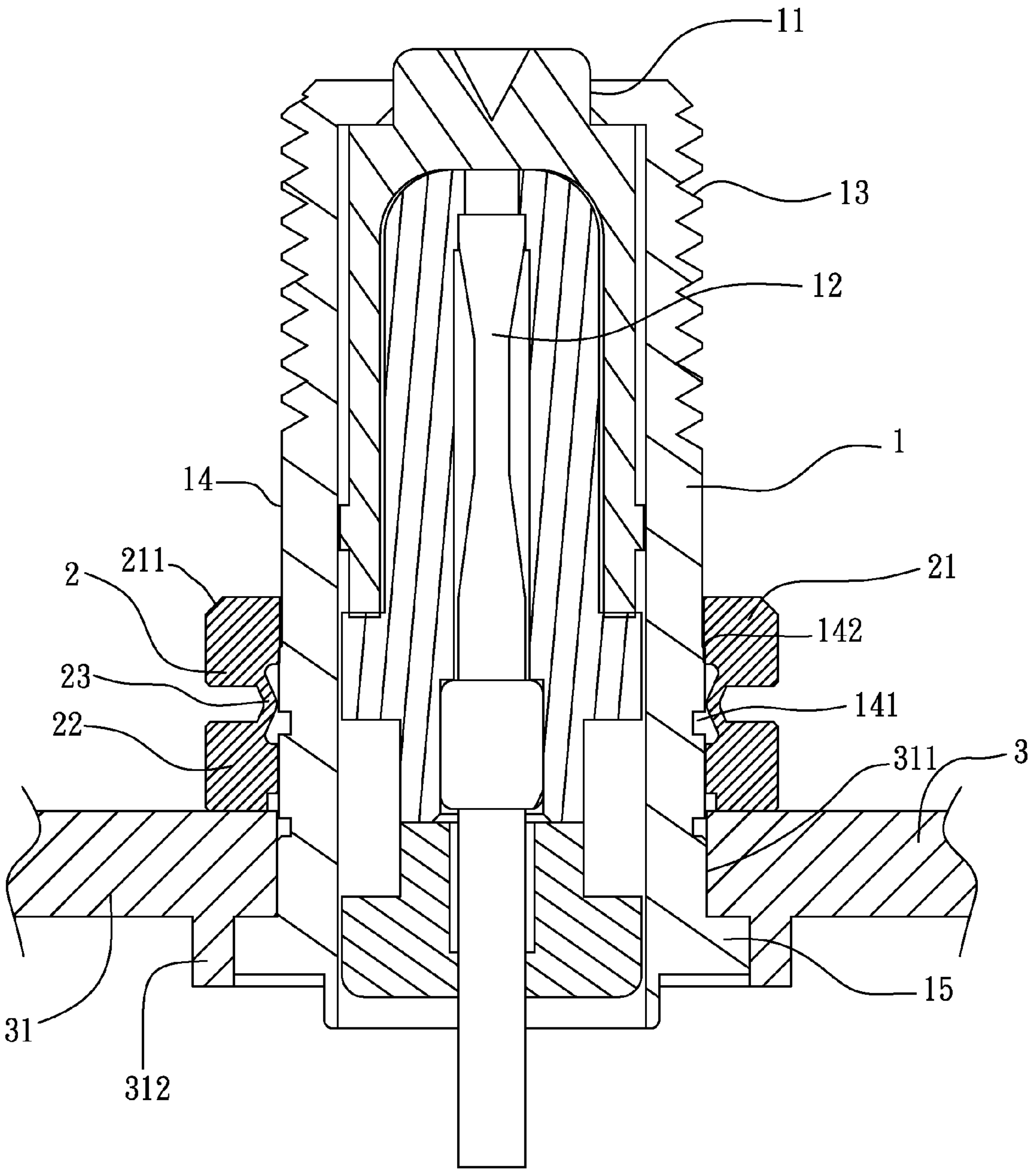
FIG. 5 is a cross sectional view of the assembly of the signal connector and the electronic equipment shown in FIG. 4.

The latching ring 2 is a ring-shaped member, an arched connecting sheet 23 is provided between a top ring member 21 and a bottom ring member 22 for connection. As shown in FIG. 5, when being assembled, the latching ring 2 is sleeved in via the top end of the connector main body 1, the latching ring 2 is provided on the combing ring-shaped surface 14 due to the base seat 31, so the bottom end of the bottom ring member 22 is provided against the base seat 31, and the connecting sheet 23 is positioned in the positioning slot 141.

Figure 6:
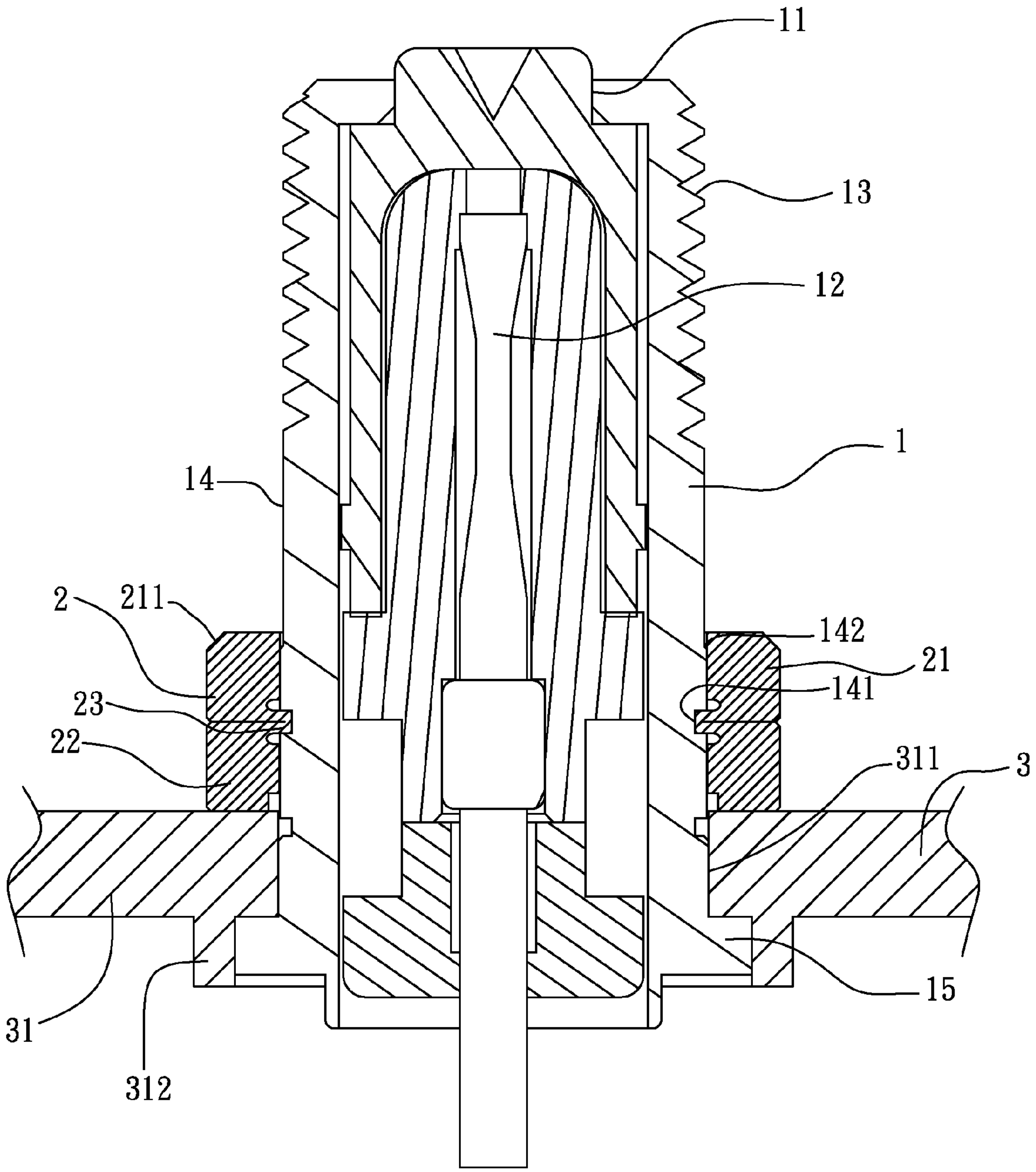
FIG. 6 is a cross sectional view illustrating the latching ring shown in FIG. 5 being punched then connected to the signal connector.

Referring to FIG. 6, if the latching ring 2 is desired to be connected to the connector main body 1, the top ring member 21 is longitudinally punched by a jig so the top ring member 21 is downwardly moved, the connecting sheet 23 is compressed and deformed so a protruding tenon is inwardly defined and latched in the positioning slot 141, so the connector main body 1 can be stably and tightly fastened on the base seat 31 of the electronic equipment 3 and can not be easily released, so an object of stable and tight fastening is achieved.

For providing a foolproof function to the described latching ring 2, the inner diameter of the top ring member 21 is smaller than the outer diameter of the flange 142 of the combing ring-shaped surface 14, so when an insert operation is wrong, the top ring member 21 is against the flange 142 and is not able to be further downwardly moved. A tilt surface 211 is formed at the periphery of the top end of the top ring member 21 and is served as an assembling indication.

Figure 7:
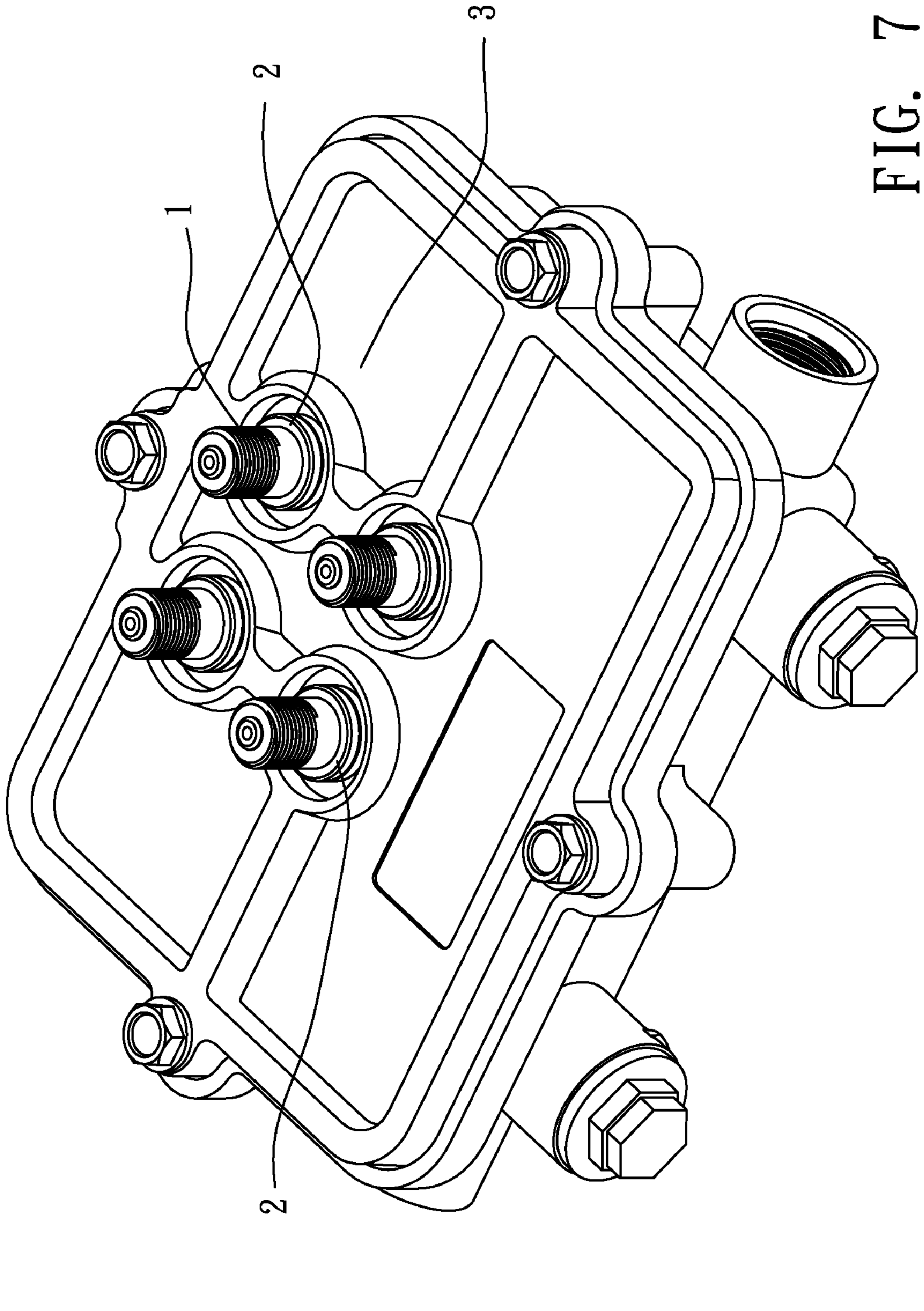
FIG. 7 is a 3D view illustrating the signal connector provided by the present invention being adopted in a coaxial cable splitter.
Figure 8:
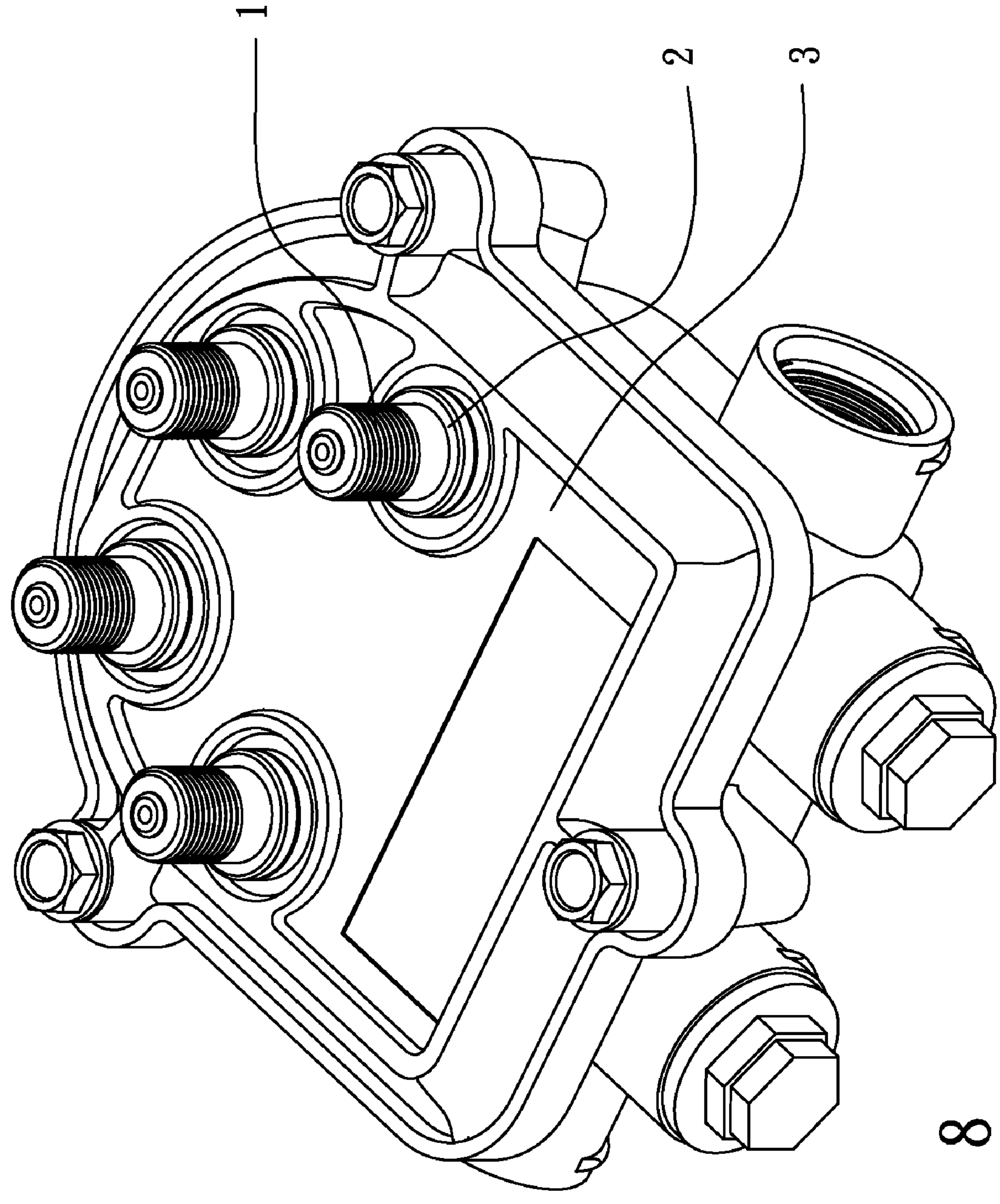
FIG. 8 is a 3D view illustrating the signal connector provided by the present invention being adopted in another coaxial cable splitter.

As shown in FIG. 7 and FIG. 8, which are schematic views of plural of the signal connectors 1 being assembled on the electronic equipment 3, e.g. a four-way coaxial cable splitter, via the latching rings 2; plural through holes are provided on a top end of the base seat 31 of the electronic equipment 3, so each of the signal connectors 1 can be passed through and positioned, then each of the latching rings 2 is respectively sleeved on each of the corresponding combing ring-shaped surfaces 14 of the signal connectors 1 with respect to an assembling direction, then the electronic equipment 3 is disposed on a jig and each of the latching rings 2 is synchronizely punched, so each of the connecting sheets 23 of the latching rings 2 is deformed and is latched in the positioning slots 141, each of the signal connectors 1 is therefore fastened on the base seat 31 and is not easy to be separated.

Figure 9:
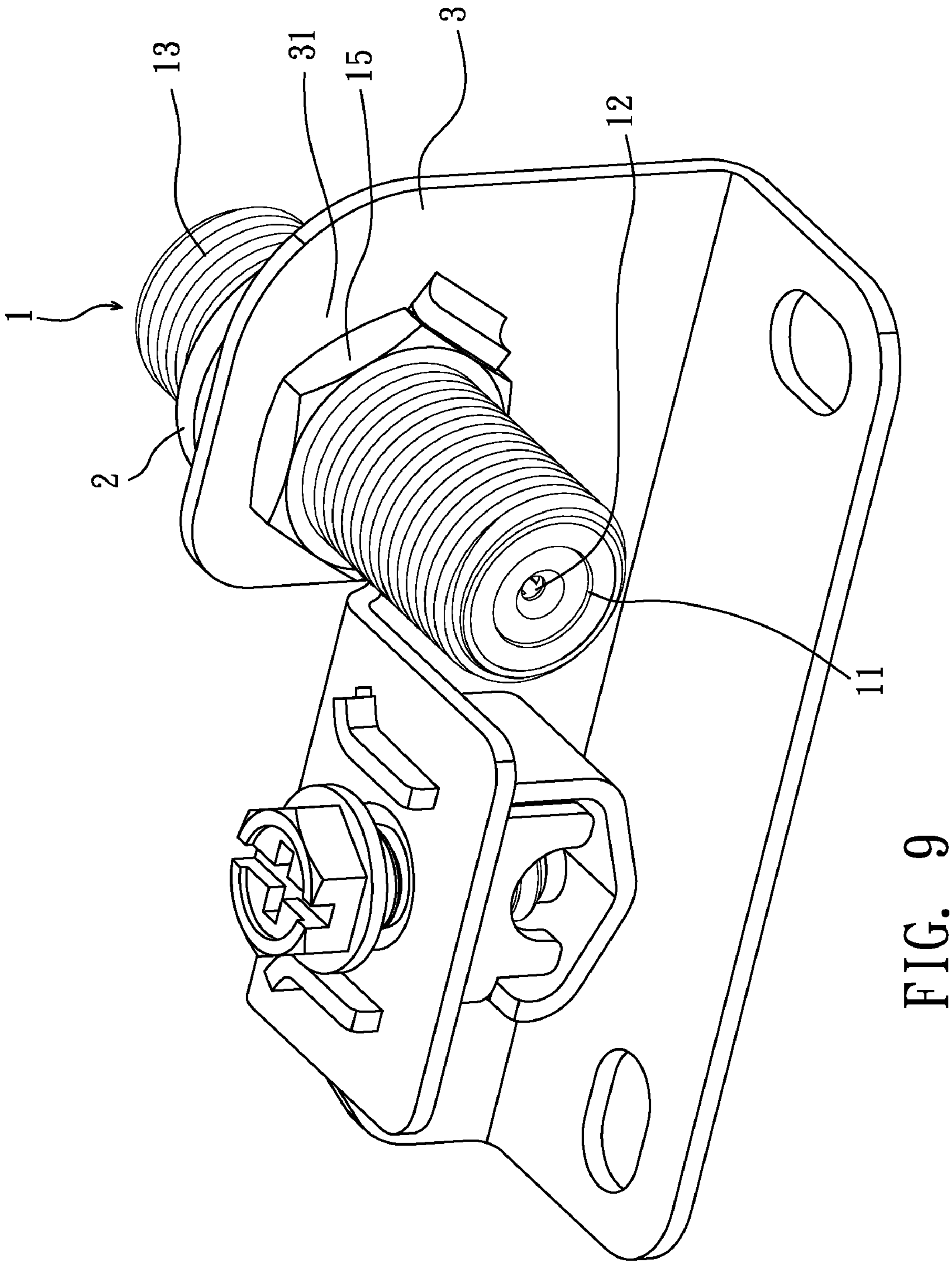
FIG. 9 is 3D view illustrating the signal connector provided by the present invention being adopted in a grounding module.
Figure 10:
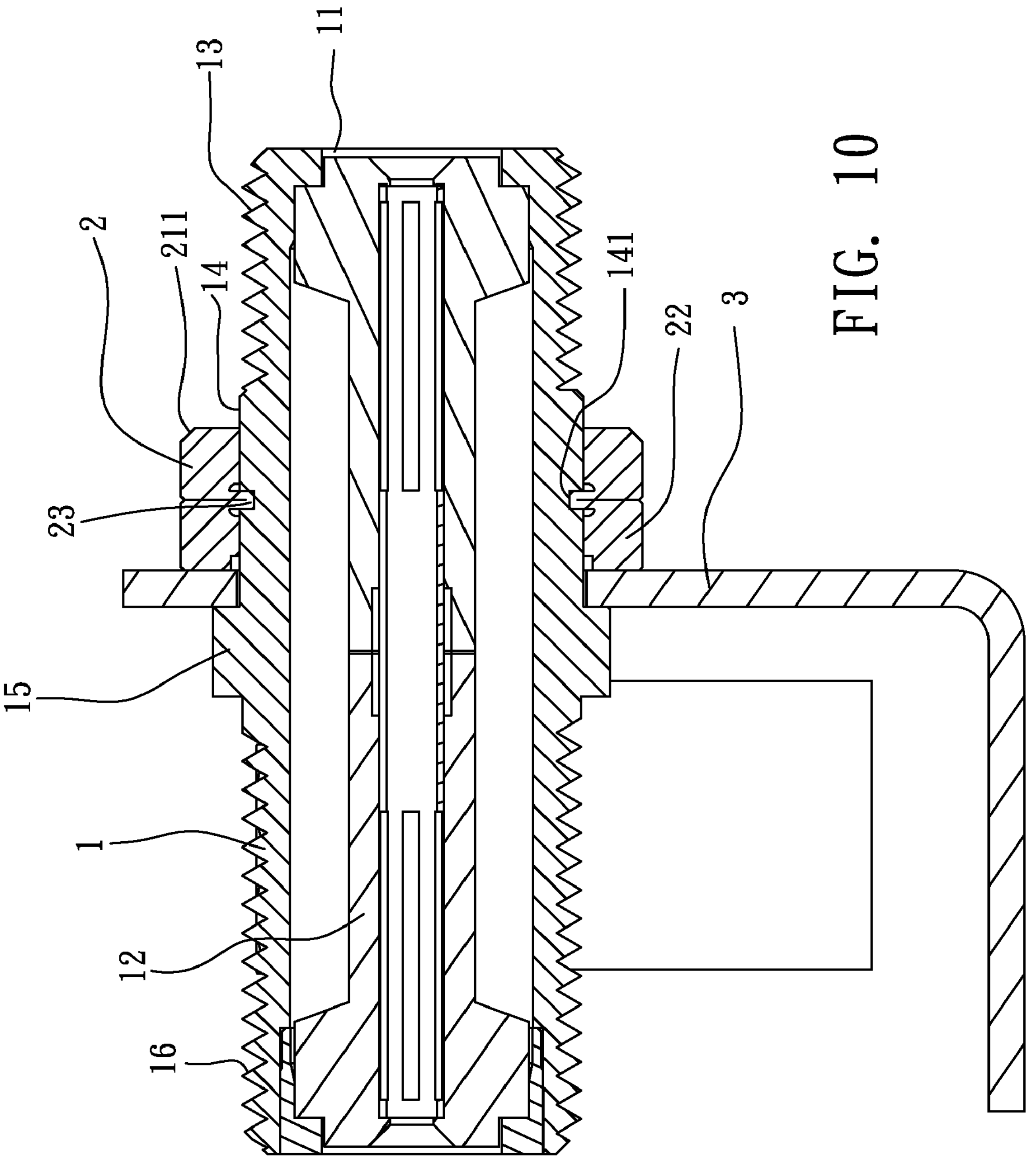
FIG. 10 is a cross sectional view illustrating the signal connector provided by the present invention being adopted in a grounding module.

As shown in FIG. 9 and FIG. 10, which are schematic views illustrating the signal connector 1 provided by the present invention being connected to another electronic equipment 3, e.g. a grounding module, the signal connector 1 is a round-column shaped member, two ends thereof are respectively provided with an insert orifice 11 and a signal terminal 12 is respectively provided inside the connector main body 1, a top portion of the signal connector 1 has a thread section 13, a middle portion of the signal connector 1 has a combining ring-shaped surface 14, and a positioning slot 141 is provided on the combining ring-shaped surface 14, the other end of the signal connector 1 is in sequence provided with a positioning section 15 and a second thread section 16 that is downwardly extended, so the signal connector is served as a transit connector.

The features of the present invention are: the combining ring-shaped surface of the signal connector can be served to tightly connect with a waterproof lining ring so a waterproof effect is obtained; and the connecting sheet of the latching ring can be latched in the positioning slot via a means of compressing deformation, so the signal connector is able to be fastened on the base seat of the electronic equipment, the connector main body is not easy to be released from the base seat unless an external force is applied to break the latching ring, so disadvantages of a conventional signal connector of being easy to be separated from an electronic equipment is improved.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fastening structure of signal connector, comprises:

a connector main body, which is a round-column shaped member, an insert orifice is provided on a top end of the connector main body, a middle portion of the connector main body has a combining ring-shaped surface, a positioning slot is provided on the combining ring-shaped surface, a bottom portion of the connector main body is provided with a positioning section; the connector main body is passed through a through hole preset on a base seat of an electronic equipment and the positioning section thereof is connected to a jointing section provided at a bottom end of the through hole; and a latching ring, an arched connecting sheet is provided between a top ring member and a bottom ring member for connection, and the latching ring is sleeved on the combining ring-shaped surface via the top end of the connector main body, so the bottom end of the bottom ring member is against the base seat and the connecting sheet is positioned in the positioning slot;

when the top ring member is punched and downwardly moved, the connecting sheet is compressed and deformed and is latched in the positioning slot, so the connector main body is stably and tightly fastened on the base seat.

2. The fastening structure of signal connector as claimed in claim 1, wherein a top portion of the connector main body has a thread section.

3. The fastening structure of signal connector as claimed in claim 1, wherein the combining ring-shaped surface is in a stepped shape, so a flange having a larger diameter is obtained, and the positioning slot is provided below the flange; and the inner diameter of the top ring member of the latching ring is smaller than the outer diameter of the flange.

4. The fastening structure of signal connector as claimed in claim 1, wherein a tilt surface is formed on the periphery of the top end of the top ring member.

5. The fastening structure of signal connector as claimed in claim 3, wherein a tilt surface is formed on the periphery of the top end of the top ring member.

6. The fastening structure of signal connector as claimed in claim 1, wherein the positioning section is a block member having a geometric shape, and the jointing section is a rib member having a shape corresponding to the shape of the positioning slot.

7. The fastening structure of signal connector as claimed in claim 1, wherein the electronic equipment is a coaxial cable distributor, or a multitap, or a splitter, or a signal amplifier, or a direction coupler module.

8. A fastening structure of signal connector, comprises:

a connector main body, which is a round-column shaped member, two ends thereof are respectively provided with an insert orifice and respectively provided with a signal terminal in the connector main body, a top portion of the connector main body has a thread section, a middle portion of the connector main body has a combining ring-shaped surface, and a positioning slot is provided on the combining ring-shaped surface, a positioning section and an extended second thread section are in sequence provided below the positioning slot; the connector main body is passed through a through hole preset on a base seat of an electronic equipment and the positioning section is against the base seat; and a latching ring, an arched connecting sheet is provided between a top ring member and a bottom ring member for connection, and the latching ring is sleeved on the combining ring-shaped surface via the top end of the connector main body, so the bottom end of the bottom ring member is against the base seat and the connecting sheet is positioned in the positioning slot;

when the top ring member is punched and downwardly moved, the connecting sheet is compressed and deformed and is latched in the positioning slot, so the connector main body is stably and tightly fastened on the base seat.

9. The fastening structure of signal connector as claimed in claim 8, wherein the combining ring-shaped surface is in a stepped shape, so a flange having a larger diameter is obtained, and the positioning slot is provided below the flange; and the inner diameter of the top ring member of the latching ring is smaller than the outer diameter of the flange.

10. The fastening structure of signal connector as claimed in claim 8, wherein a tilt surface is formed on the periphery of the top end of the top ring member.

11. The fastening structure of signal connector as claimed in claim 9, wherein a tilt surface is formed on the periphery of the top end of the top ring member.

12. The fastening structure of signal connector as claimed in claim 8, wherein the positioning section is a block member having a geometric shape.

13. The fastening structure of signal connector as claimed in claim 8, wherein the electronic equipment is a grounding module.

* * * * *